(12) United States Patent
Mohanty et al.

(10) Patent No.: US 9,825,797 B2
(45) Date of Patent: Nov. 21, 2017

(54) INDIVIDUAL AND GROUP PAGING IN A WIRELESS NETWORK

(75) Inventors: Shantidev Mohanty, Santa Clara, CA (US); Rui Huang, Beijing (CN); Honggang Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 636 days.

(21) Appl. No.: 13/997,233

(22) PCT Filed: Apr. 17, 2012

(86) PCT No.: PCT/US2012/033960
§ 371 (c)(1),
(2), (4) Date: Sep. 4, 2014

(87) PCT Pub. No.: WO2013/066396
PCT Pub. Date: May 10, 2013

(65) Prior Publication Data
US 2015/0038179 A1    Feb. 5, 2015

Related U.S. Application Data

(60) Provisional application No. 61/556,109, filed on Nov. 4, 2011.

(51) Int. Cl.
*H04L 27/26* (2006.01)
*H04W 72/04* (2009.01)
(Continued)

(52) U.S. Cl.
CPC ......... *H04L 27/2675* (2013.01); *H04B 7/024* (2013.01); *H04B 7/0456* (2013.01);
(Continued)

(58) Field of Classification Search
CPC .. H04W 36/0088; H04W 68/02; H04B 7/024; H04J 3/12; H04L 1/0026; H04L 1/0077;
(Continued)

(56) References Cited

U.S. PATENT DOCUMENTS

| | | |
|---|---|---|
| 2007/0254686 A1 | 11/2007 | Wang et al. |
| 2010/0285816 A1 | 11/2010 | Vos et al. |
| 2011/0134841 A1 | 6/2011 | Shaheen |

FOREIGN PATENT DOCUMENTS

| | | |
|---|---|---|
| CN | 1565140 A | 1/2005 |
| JP | 2004/538731 | 12/2004 |

(Continued)

OTHER PUBLICATIONS

Park et al. ([PWR] Updated merged text proposal of idle mode operation for PWG RG discussion, IEEE 802.16 Broadband Wireless Access Working Group, Feb. 15, 2011), hereinafter Park.*

(Continued)

*Primary Examiner* — George Eng
*Assistant Examiner* — Jing Gao
(74) *Attorney, Agent, or Firm* — Thorpe North & Western

(57) ABSTRACT

Methods and systems are described for individual and group paging of a wireless device via a wireless communications network. The method can include setting a paging cycle and a paging offset for the wireless device. A wireless device can be assigned to a device group using a device group identifier. The wireless device can wake up to check for paging events received via the wireless communication network during a portion of the paging cycle. A further operation can be receiving a group paging event for the device group at the wireless device during the portion of the paging cycle.

26 Claims, 8 Drawing Sheets

(51) Int. Cl.

| | |
|---|---|
| H04B 7/024 | (2017.01) |
| H04W 4/06 | (2009.01) |
| H04W 4/00 | (2009.01) |
| H04W 52/24 | (2009.01) |
| H04L 5/00 | (2006.01) |
| H04L 5/14 | (2006.01) |
| H04W 52/14 | (2009.01) |
| H04W 68/02 | (2009.01) |
| H04B 7/0456 | (2017.01) |
| H04W 24/02 | (2009.01) |
| H04W 72/08 | (2009.01) |
| H04J 3/12 | (2006.01) |
| H04L 1/00 | (2006.01) |
| H04W 76/00 | (2009.01) |
| H04W 76/02 | (2009.01) |
| H04J 11/00 | (2006.01) |
| H04L 1/18 | (2006.01) |
| H04W 56/00 | (2009.01) |
| H04B 7/06 | (2006.01) |
| H04W 72/02 | (2009.01) |
| H04W 52/34 | (2009.01) |
| H04W 84/14 | (2009.01) |
| H04W 88/02 | (2009.01) |
| H04W 88/08 | (2009.01) |
| H04W 72/12 | (2009.01) |

(52) U.S. Cl.
CPC ............ *H04B 7/0626* (2013.01); *H04J 3/12* (2013.01); *H04J 11/00* (2013.01); *H04L 1/0026* (2013.01); *H04L 1/0077* (2013.01); *H04L 1/1812* (2013.01); *H04L 5/0035* (2013.01); *H04L 5/0053* (2013.01); *H04L 5/0055* (2013.01); *H04L 5/0078* (2013.01); *H04L 5/14* (2013.01); *H04L 27/2646* (2013.01); *H04L 27/2662* (2013.01); *H04W 4/005* (2013.01); *H04W 4/06* (2013.01); *H04W 24/02* (2013.01); *H04W 52/146* (2013.01); *H04W 52/242* (2013.01); *H04W 56/0015* (2013.01); *H04W 68/02* (2013.01); *H04W 72/02* (2013.01); *H04W 72/042* (2013.01); *H04W 72/0413* (2013.01); *H04W 72/085* (2013.01); *H04W 76/002* (2013.01); *H04W 76/021* (2013.01); *H04W 52/244* (2013.01); *H04W 52/34* (2013.01); *H04W 72/12* (2013.01); *H04W 84/14* (2013.01); *H04W 88/02* (2013.01); *H04W 88/08* (2013.01); *Y02B 60/50* (2013.01)

(58) Field of Classification Search
CPC ....... H04L 5/0055; H04L 5/0078; H04L 5/14; H04L 27/2662
See application file for complete search history.

(56) References Cited

FOREIGN PATENT DOCUMENTS

| | | | |
|---|---|---|---|
| KR | 2009/0129587 | 12/2009 | |
| WO | WO 2011/062841 A1 | 5/2011 | |
| WO | WO 2011/066409 A1 | 6/2011 | |
| WO | WO 2011/100497 A1 | 8/2011 | |
| WO | WO 2011133195 A1 * | 10/2011 | ......... H04L 12/5895 |
| WO | 2013/066396 A1 | 5/2013 | |

OTHER PUBLICATIONS

Jung et al. (Group paging for M2M group, IEEE 802.16 Broadband Wireless Access Working Group, May 6, 2011), hereinafter Jung.*
Tarradell et al. (Methods for MGID Change Detection, IEEE 802.16 Broadband Wireless Access Working Group, Sep. 11, 2011), hereinafter Tarradell.*
Lee et al. (Methods for MGID Change Detection (m2m16.1awd), IEEE C802.16p-11/0274r2, Sep. 11, 2011).*
Japanese Search Report received for Japanese application No. 2014-539924 dated Apr. 21, 2015. 4 pages including English Translation.
Office Action received for Korean application 2014-7014607 dated Aug. 7, 2015, 8 pages including English translation.
Tarradell et al, "Methods for MGID Change Detection (m2m16. 1awd)", IEEE 802.16 Broadband Wireless Access Working Group <http://ieee802.org/16>, Sep. 2011, pp. 2, IEEE.
Jung et al, "Group Paging for M2M Group", IEEE 802.16 Broadband Wireless Access Working Group, May 2011, 6 pages.
Li et al, "Proposal for Co-ordinated Group Paging in IEEE P802. 16p-11/0033", IEEE 802.16 Broadband Wireless Access Working Group, Nov. 2011, 3 pages.
Marks et al, "Enhancements to Support Machine-to-Machine Applications", IEEE P802.16p AWD, May 25, 2011, 38 pages.
Marks et al, "Wireless MAN-Advanced Air Interface for Broadband Wireless Access Systems", IEEE P802.16p-11/0033, Oct. 2011, 63 pages.
Nigam et al, "MGID Harmonization", IEEE 802.16 Broadband Wireless Access Working Group, Nov. 2011, 10 pages.
Tseng et al, "Group Paging by Multicast", IEEE C802.16p-11_0004, Mar. 2011, 3 pages.
LG Electronics et al., "[PWR] Updated merged text proposal of idle mode operation for PWG RG discussion", IEEE 802.16 Broadband Wireless Access Working Group, IEEE C802.16p-rg-11/0036r1, Feb. 15, 2011, 3 pages.
Jung et al. "Group paging for M2M group", IEEE 802.16 Broadband Wireless Access Working Group, May 6, 2011, pp. 1-5.
LG Electronics, "Reply contribution on C80216p-11/0002 (Idle mode operation)", IEEE C802.16p-11/0037r4, IEEE 802.16 Broadband Wireless Access Working Group, Mar. 15, 2011, 6 pages.
International Search Report and Written Opinion received for PCT application No. PCT/US2012/033960, dated Oct. 31, 2012, 9 pages.

* cited by examiner

INDIVIDUAL AND GROUP PAGING IN A WIRELESS NETWORK

BACKGROUND

The Internet has been expanding into a more mobile Internet by using radio cellular technologies. An Internet of Things (IoT) is what some people envision to connect billions of physical or virtual objects in the Internet cloud. This enables these objects to exchange information not only among themselves but with the environments and servers that provide services to benefit the devices and end users. Although this concept seems simple, there are significant challenges in wirelessly communicating with billions of objects.

Wireless mobile services have been mainly designed for human communications that include both human-to-human and human-to-server communications. Human communications utilize many devices, such as personal computers (PCs), notebooks, tablets, and smartphones, and such devices provide similar interfaces and services to users (e.g. video, voice, and multimedia). Such devices connected to a wireless network can be addressed individually. Specifically, wireless communication technologies are configured to provide an individual connection identifier for each service type that is provided on a device.

In contrast, the machine-to machine (M2M) communication market is highly fragmented, with different vertical sectors targeting services ranging from telemetry (e.g. smart meter, remote monitoring), telematics (e.g. fleet tracking), to surveillance video. These M2M services and similar types of services have very different specifications. For example, sending similar requests to a group of wireless devices may be desirable. In the example situation of a utility monitoring device, there may be a large group of wireless utility monitoring devices (e.g., 100-1000 devices) that may receive the same monitoring message from a server. This monitoring message can request a report from each device to collect the utility usage data from the utility monitoring devices. In this scenario, a duplicate monitoring message may be sent to each device. However, sending a separate monitoring message to each device individually can be slow and can increase the amount of traffic sent over a wireless network, especially as the number of mobile devices and M2M devices connected to wireless networks increases.

In some situations, the intended recipient device(s) is in idle mode to conserve power. As a result, the device(s) in idle mode are paged so that the device(s) can transition from idle mode to connected mode to receive the monitoring message. When a large number of devices transition from idle mode to connected mode, paging these devices individually can result in excessive signaling overhead.

DETAILED DESCRIPTION

Figure 1:
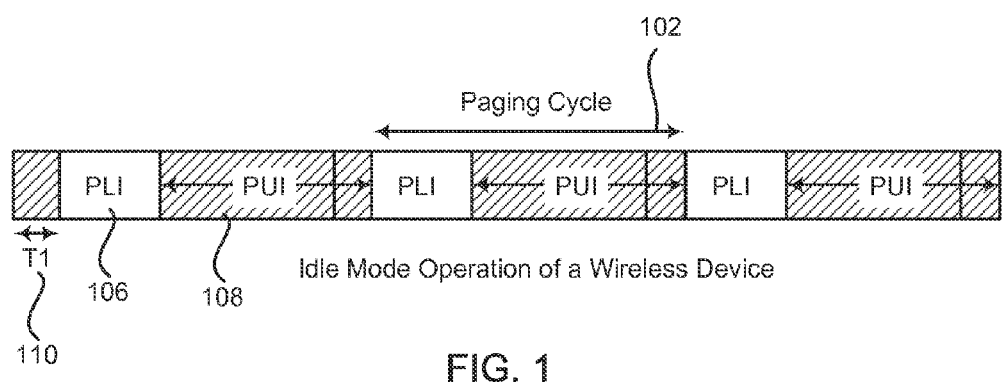
FIG. 1 is a block diagram illustrating an example of an idle mode operation of a wireless device.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology can carry out paging for individual wireless devices and paging for groups of wireless devices in a coordinated manner. The capacity to provide individual paging is defined as the ability for a single device to be individually paged with a single message. In addition, group paging means that operations are available to page multiple wireless device(s) with one group paging message in a wireless communication system. These systems and methods can provide group paging operations as well as individual paging operations in a coordinated manner for a communication system. Such coordinated paging can be used in the context of wireless devices that may include: M2M (Machine-to-Machine) devices, D2D (Device-to-Device) systems, MTC (Machine Type Communications), cell phones, MS (Mobile Stations), UE (User Equipment) tablets, laptops, and other wirelessly enabled devices.

In order to conserve power when communicating with a wireless network, wireless devices may be in idle mode most of the time. FIG. 1 is a block diagram illustrating an example of an idle mode operation of a wireless device. More specifically, a paging cycle 102 for a device is shown. A paging cycle may be measured in milliseconds or seconds. For example, a paging cycle may be several hundred milliseconds long or an amount deemed to be useful for the specific wireless device.

For a paging operation, each wireless device or a group of devices can be assigned at least two parameters that govern the overall idle mode and paging operations. These parameters can include a paging cycle and paging offset. FIG. 1 further illustrates that the paging cycle can include a paging listening interval (PLI) 106 and a paging unavailable interval (PUI) 108. The location of the PLI inside the paging cycle is determined by a paging offset 110. The paging offset is defined as a duration of time between a beginning of a paging cycle to the point where the PLI interval starts. The period for which the wireless device or mobile station (MS) listens for paging messages is the paging listening interval (PLI), and the period during which the wireless device powers off a radio interface is known as the paging unavailable interval (PUI). In addition to a paging cycle and paging offset, each wireless device may be assigned with another parameter for a duration of PLI, that specifies the duration for which the wireless device remains awake in each paging cycle. One paging unavailable interval and one paging listening interval constitute a paging cycle as shown in FIG. 1. Using a longer paging cycle may increase the power saved by the wireless device or MS. However, a longer paging cycle also means that a longer time period may pass before the wireless device can receive paging messages and communicate with the wireless network. Thus, a balance can be reached between saving power and responsiveness of the wireless device.

While in idle mode, the wireless device can wake up to check for events such as a paging event during the PLI that can instruct the wireless device to transition into connected mode. Once in every paging cycle interval, the wireless device in idle mode can wake up and listen for paging messages. As described earlier, the location of the PLI in the paging cycle is specified by the paging offset, as shown in FIG. 1 where T1 110 is the paging offset. When traffic arrives for the idle mode wireless device or MS, the network can perform paging to locate the wireless device and to bring the wireless device back to active mode.

The paging event can be triggered for various computing reasons. For example, in one scenario, the network may trigger a paging event to deliver data and/or control traffic to the wireless device. Such traffic may be of one of the following types: individual traffic or group traffic. Traffic where the data or instructions are intended for a single recipient or one individual device is known as individual traffic. On the other hand, traffic intended to be received by a plurality of devices in a device group (DG) may be known as group traffic. To deliver individual traffic, the network addresses and pages the wireless device that is the sole intended recipient of the traffic. This operation may be referred to as individual paging. To deliver group traffic, the network addresses and pages the wireless devices in the DG for which the traffic is intended. This paging operation can be known as group paging.

This technology provides methods, systems, devices that are configured to receive both individual and group paging events while in idle mode. Thus, this technology can support the mechanism for carrying out both individual and group paging operations.

Figure 2:
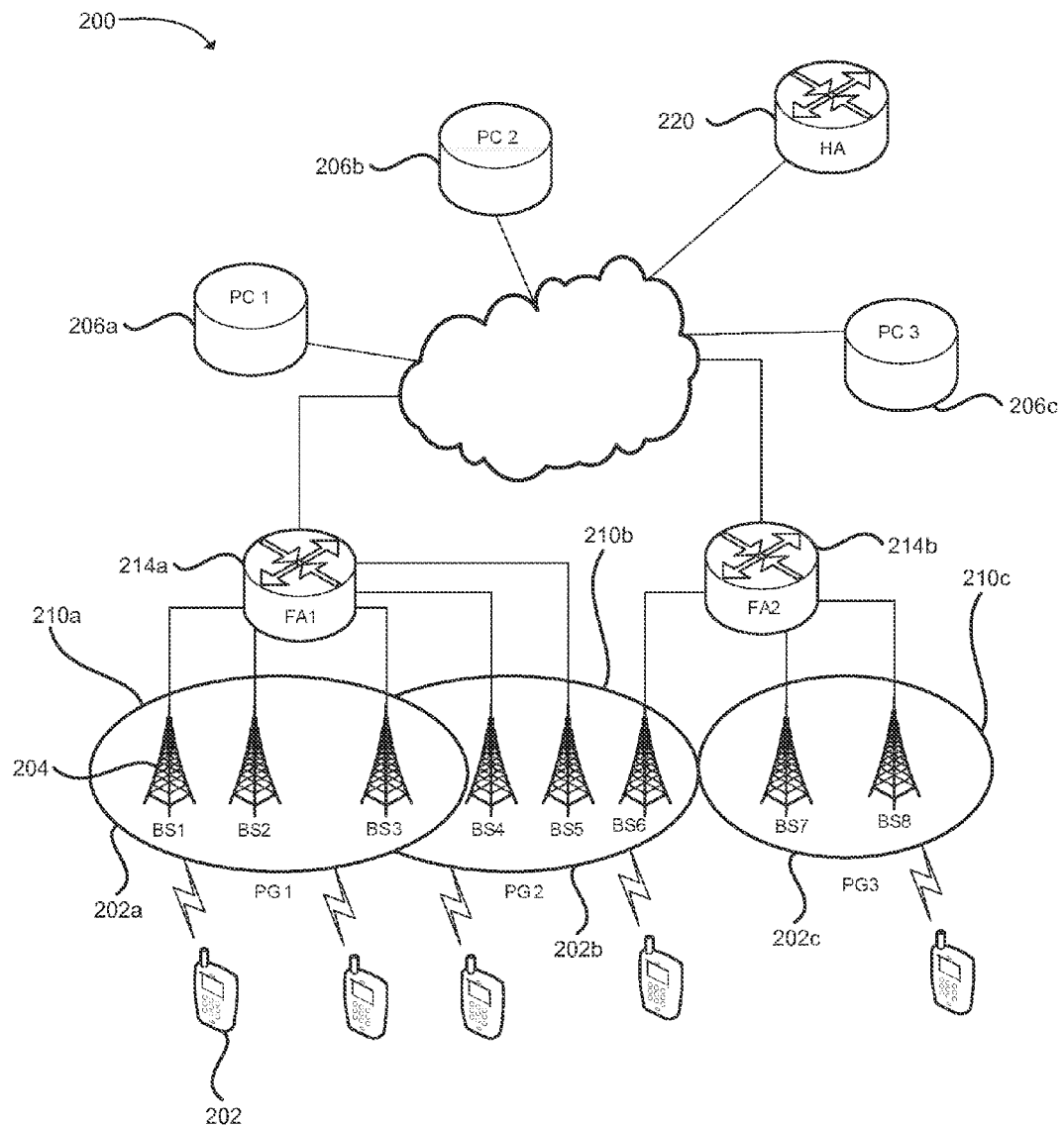
FIG. 2 illustrates an example of a system for individual paging and group paging of a wireless device via a wireless communications network.

FIG. 2 illustrates an example of a system for individual and group paging of wireless devices via a wireless communications network. The system can include a wireless device 202 configured to use a paging cycle to receive paging messages from a wireless communications network 200. The wireless device can be a mobile station (MS), user equipment (UE), cellphone, M2M device, tablet, laptop, or another type of wirelessly connected device. The wireless device can check for a paging event during a paging listening interval (PLI) of the paging cycle.

A group paging event can be obtained for a device group during the PLI at the wireless device. Multiple paging groups are illustrated in FIG. 2. Each paging group 210a-c can contain a plurality of wireless devices that communicate through and are connected to wireless base stations (BSs) of the wireless network. In other words, a paging group is a logical area covered by a group of base stations for the purpose of paging operations. The wireless device can include one or more antennas configured to communicate with a base station (BS), an evolved Node B (eNB), or other type of wireless wide area network (WWAN) access point. The wireless device can be configured to communicate using at least one wireless communication standard including 3GPP LTE, WiMAX, HSPA, Bluetooth, and/or WiFi. The wireless device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN). The wireless network can also include a home agent (HA) 220 to store information about mobile nodes whose permanent home address is in the home agent's network. A foreign agent (FA) 214a-b can also be provided to track information about mobile wireless devices visiting the wireless communication network.

A device group (DG) can be a group of wireless devices grouped together for communication purposes. In one example, the device group may be every wireless device connected to the base station or the device group may be a selected subset of those wireless devices. In addition, the device group can be a subset of the wireless devices connected to multiple base stations.

Once a group paging event is received, then the wireless device can transition from idle mode to connected mode to receive group traffic for the device group. For example, a group paging message may be received to hot reboot a group of power meters (i.e., reboot the power meters without power down). As a result, a single group paging event can be sent to the group of power meters which can then send a subsequent response message or can then be waiting to receive the subsequent group message because the devices have received the group paging event. In this case, just one group paging event can then be sent to the multiple wireless devices belonging to the device group, as opposed to sending an individual paging event to each member of the device group. Sending individual paging messages to wireless devices in a device group would otherwise consume significantly more wireless broadcast time. For example, N times as much network broadcast time would be consumed by sending individual paging messages as compared to sending one group paging message, where N equals the number of wireless devices in the device group.

The wireless devices in one device group (DG) may share a common identification, hereafter referred to as a device group identifier (DGID). In addition to the DGID, each individual wireless device can also have an individual identity, hereafter referred to as device ID (DID).

An individual paging event and the group paging event can be received by a wireless device during the same PLI. The individual and group paging operations can be performed by one or more networking devices. For example, one network device (or network entity) can configure the paging parameters and another network device (or network entity) can send the paging events. An example of a network device that sends paging events is a paging controller 206a-c as in FIG. 2. The paging controller can set a paging cycle and a paging offset for wireless devices to receive paging messages. This means that the paging controller tells the wireless devices what the paging cycle parameters will be. In addition, the paging controller can send individual paging events and group paging events to wireless devices in a device group. The paging controller can store information about idle mode wireless devices that are residing in the paging groups associated with the paging controller.

The paging server can be aware of the device group identifier for the wireless devices. In some situations, the paging server may assign the device group identifier. Alternately, the device group identifier may be assigned by a different network entity.

In one example, individual paging events and group paging events can be sent so that both types of paging events are received during the same paging listening interval (PLI) by a wireless device. The wireless device can use one paging cycle and paging offset for both individual and group paging, and the wireless device can wake up once during the paging cycle to listen for both individual and group paging events. In this case, the wireless devices in the same device group (DG) may share the same value for their paging cycle and paging offset parameters. If at least one wireless device is part of more than one DG, the wireless devices in the multiple DGs containing the wireless device can share the same paging cycle and paging offset. Alternatively, the individual paging events and group paging events can be sent during different paging listening intervals (PLIs), as will be discussed more later.

Figure 3:
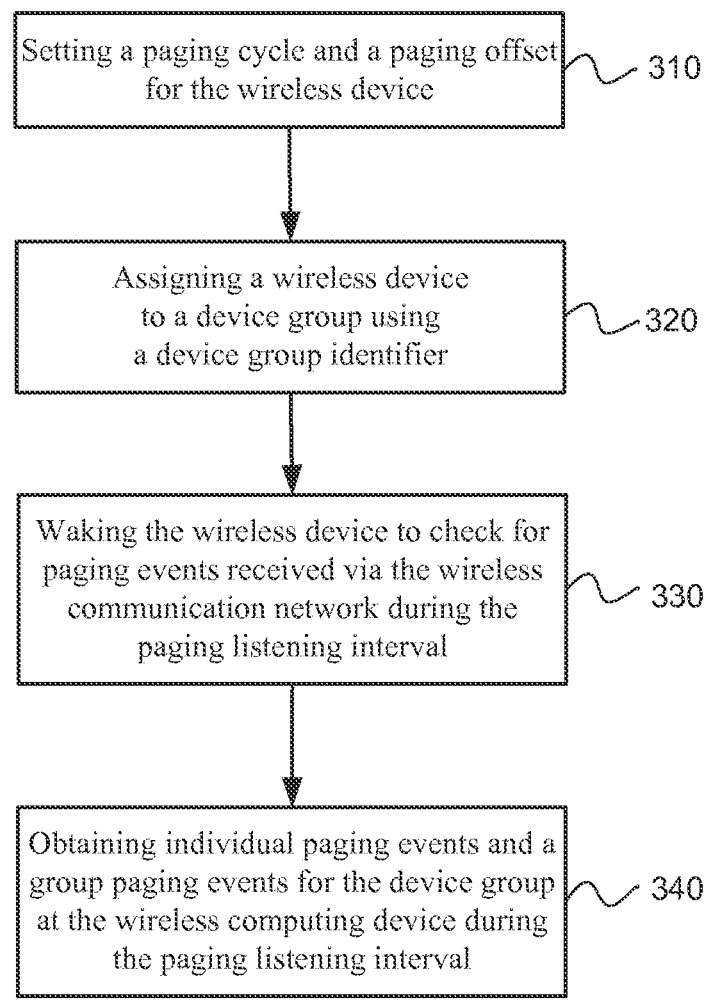
FIG. 3 illustrates an example method for individual paging and group paging of a wireless device via a wireless communications network.

FIG. 3 illustrates an example method for individual and group paging of a wireless device via a wireless communications network. The method can include the operation of setting a paging cycle and a paging offset for the wireless device, as in block 310. A further operation can be assigning a wireless device to a device group using a device group identifier, as in block 320.

The wireless device can wake up to check for paging events received via the wireless communication network during a portion of the paging cycle, as in block 330. More specifically, the wireless device can wake up to check for paging events during the paging listening interval (PLI) of the paging cycle. In one configuration, individual paging events and the group paging events can both be received during the PLI, as in block 340.

A group paging event can be received for the device group at the wireless device during the PLI portion of the paging cycle. Then the wireless device can transition from idle mode to connected mode to receive group traffic for the device group after the group paging event has been received. This allows a network entity on the wireless network to transmit a group message or group traffic to multiple wireless devices at one time.

Figure 4:
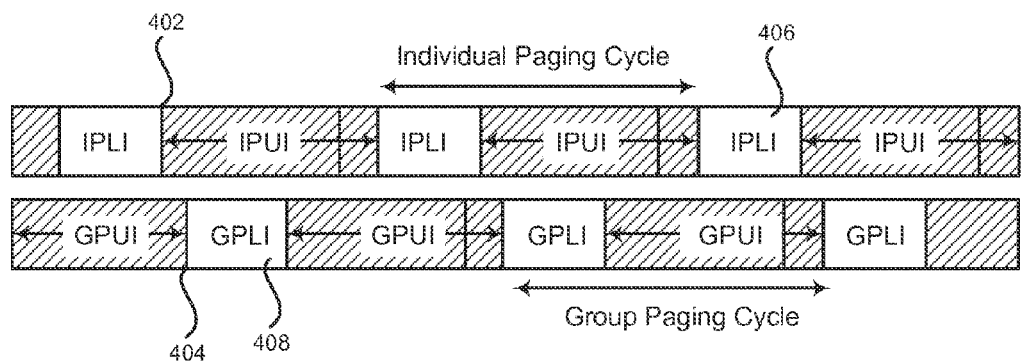
FIG. 4 is a block diagram illustrating an example of a plurality of paging cycles for a wireless device, including an individual paging cycle and a separate group paging cycle.

FIG. 4 illustrates an example of multiple paging cycles for a wireless device and the paging cycles can include an individual paging cycle 402 and a separate group paging cycle 404. In other words, the wireless device can use different paging cycles and/or paging offsets for individual paging and group paging. This means that the group paging cycle can have a different group paging cycle and a different group paging offset to define when the group paging messages will be listened for and received. More specifically, a first paging cycle and first individual paging listening interval (IPLI) 406 can be used to listen for individual paging messages, and a second group paging cycle and second group paging listening interval (GPLI) 408 can be used to listen for group paging messages. As described earlier, the wireless device can be a machine-to-machine (M2M) device, a mobile station (MS), or another wirelessly connected device.

If a wireless device belongs to more than one DG, the DGs can share the same paging cycle and paging offset. Specifically, the wireless device may belong to more than one device group for support different kinds of applications. For example, one wireless device for building safety may belong to both a fire alarm device group and a carbon monoxide alarm device group. In this situation, a group paging cycle and a group paging offset can be shared between the two or more device groups, when the wireless device belongs to the plurality of device groups. With this example, the fire alarm group paging cycle and the carbon monoxide alarm group paging cycle and group paging offset may be the same.

Figure 5:
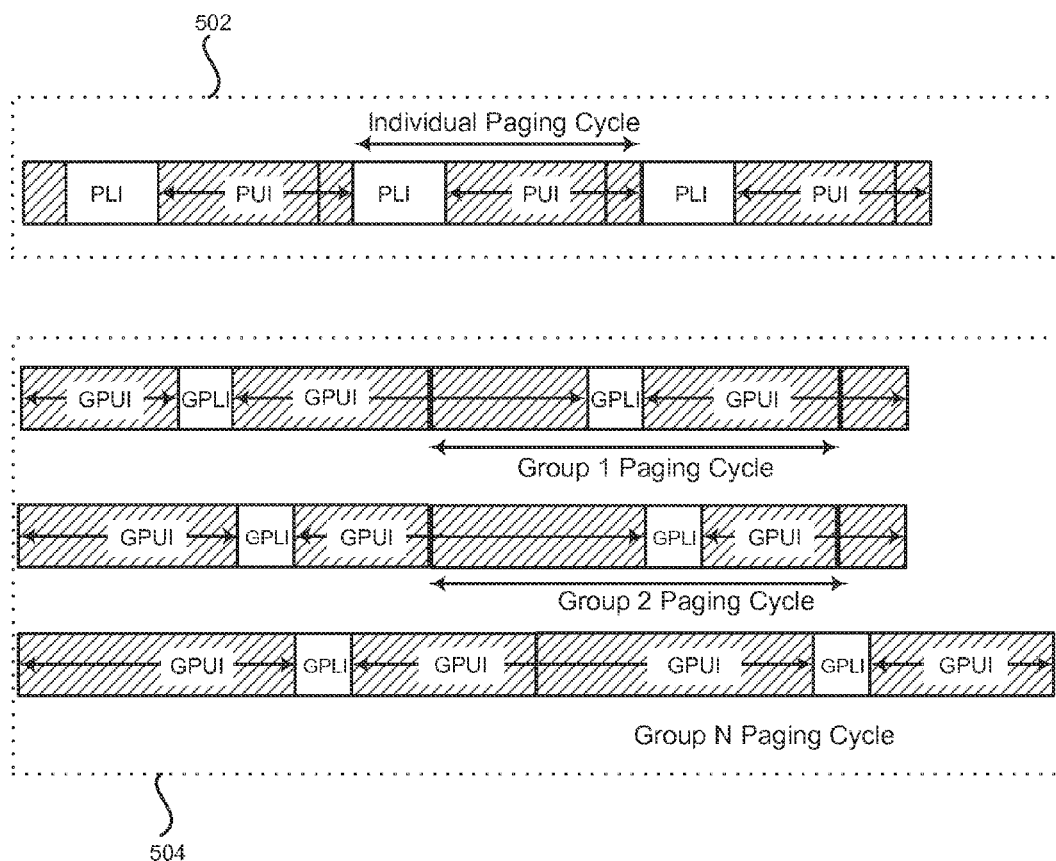
FIG. 5 is a block diagram illustrating an example of an individual paging cycle and multiple device groups with multiple group paging cycles.

FIG. 5 is a block diagram illustrating an example of a communication interface where a wireless device has an individual paging cycle 502. In addition, the wireless device can be assigned to multiple DGs (device groups) 504 and the multiple DGs can each have a separate paging cycle and separate paging offset. This means the wireless device can use different paging cycles and/or paging offsets for individual paging and group paging. Where the device belongs to more than one DG, each of the DG-s numbered 1-N may have different a paging cycle and/or paging offset as illustrated.

Figure 6:
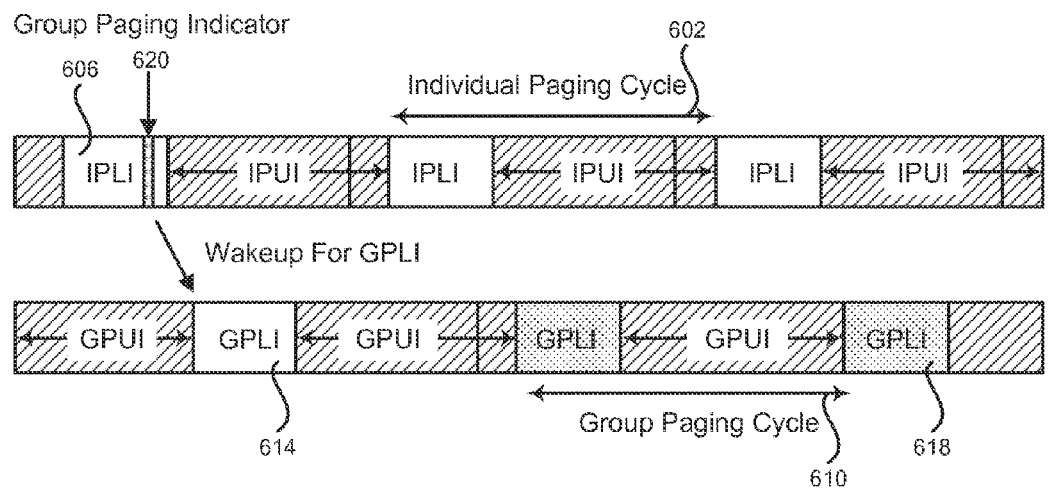
FIG. 6 is a block diagram illustrating an example of an individual paging cycle using a group paging indicator and a group paging cycle with a group paging listening interval.

FIG. 6 is a block diagram illustrating an example of an individual paging cycle and a group paging cycle. This example configuration can provide a group paging indicator 620 that is received during the individual paging cycle 602 to activate a wireless device to wake up and receive group paging messages. In other words, the group paging indicator is an advance warning to the wireless device that a group paging event is going to be broadcast and the wireless device should wake up in the future to receive group paging event. When no group paging indicator is received, then the wireless device will not wake up later in the ongoing group paging cycle to receive the group paging messages.

In this case, the wireless device has different paging cycles and paging offsets for individual and group paging. An individual paging cycle 602, individual paging offset, and individual paging listening interval (IPLI) 606 can be set for the wireless device. In addition, a group paging cycle 610, group paging offset, and group paging listening interval (GPLI) 614 can be set for the wireless device. The group paging cycle includes the group paging listening interval (GPLI) based on the group paging cycle and group paging offset. In addition, the individual paging cycle includes an individual paging listening interval (IPLI) based on the paging cycle and paging offset for individual paging.

To conserve power, the wireless device does not wake up during every possible GPLI 614. Instead, the wireless device may selectively wake up during some GPLIs based on the group paging indicator 620 received about the group paging operation during the IPLI 606. The wireless device can wake up to check for a paging event during an individual paging listening interval (IPLI) of the paging cycle. When a group paging message is expected, then a group paging indicator 620 can be received during the IPLI at the wireless device. The group paging indicator sent during the IPLI can contain an indication or information about a pending or upcoming group paging event. After a group paging indicator has been received, the wireless device can expect to receive a group paging event during the next GPLI. The wireless device can then wake up during one or more of the next GPLI intervals following the IPLI interval. The wireless device can then transition from idle mode to connected mode to receive group traffic for the device group after the group paging event has been received. If no group paging indicator is received, then the GPUI can be extended. The omitted. GPLI interval is illustrated as a grayed out interval 618 where the wireless device will not wake up because no group paging indicator was received. The extension of the GPUI can reduce the power used by the wireless device and may improve battery life in the wireless device.

The group paging indicator can include detailed information about an upcoming group paging event. For example, the group paging indicator can include group identification (GID) information in the group paging indicator for the upcoming group paging event. The GID information may be an identifier or group number for the paging group.

In some situations, there may be multiple paging groups with various group paging cycles and group listening intervals. Information can also be received in the group paging indicator about multiple group paging events that are pending. The group identifier can allow the wireless device to know during which GPLIs to wake up. The group paging indicator can also include the group paging offset and other group paging cycle information in the group paging indicator for the upcoming group paging events. Alternatively, the group paging identifier can include other information that allows the wireless device to wake up during multiple GPLIs to receive group paging information about multiple groups.

Figure 7:
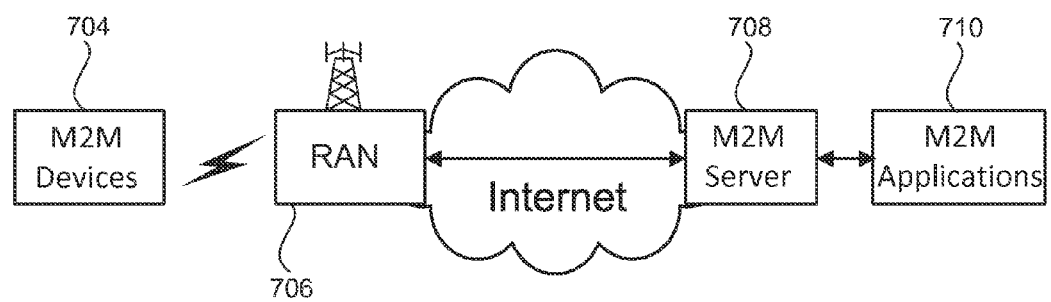
FIG. 7 illustrates an example configuration of a wireless communication system where the wireless devices are M2M devices.

FIG. 7 illustrates an example configuration of a wireless communication system where the wireless devices are M2M devices 704. In this example system, the M2M devices will have paging cycles that can be set by the M2M server 708. The M2M devices can also be configured to communicate with a radio area network (RAN) 706 or similar base stations.

When the M2M application(s) 710 desire to send data to the M2M devices by device group using group broadcasts, the M2M server 708 can send out group paging messages, as described previously. In this type of machine-to-machine (M2M) communications, a set of wireless devices may belong to device group. When the devices belong to a machine-to-machine communication system, the device group may be called an M2M Group (MG).

The methods, systems, and devices described earlier have been described as using a wireless device. The wireless device can be a mobile station (MS), a user equipment (UE) or a M2M (machine-to-machine) device. In one example configuration, a M2M device or a MS can be assigned to a device group using a M2M group identifier (MGID). The MGID may be a 12-bit value that uniquely identifies a downlink multicast service flow shared by a group of M2M devices within an M2M group zone. An M2M group zone is a logical zone that can include multiple base stations (BSs) or advanced base stations (ABSs). An M2M group zone can be identified by a M2M group zone ID.

An M2M Group Zone Index can be used when the mobile station is part of more than one M2M Group Zone. The M2M Group Zone Indexes are defined as localized indexes assigned to M2M Group Zones of a BS. For a given MGID and M2M Group Zone ID assigned to a M2M device, the M2M. Group Zone Index is dependent on the BS with which the M2M device is communication. A MS or M2M device may belong to multiple M2M Group Zones and have multiple M2M Group Zone IDs.

An M2MCID (M2M multicast connection ID) can be included in a paging event to identify a downlink multicast service flow. The M2MCID can be shared by a group of M2M devices within an M2M group zone. Implicitly, the M2MCID can be used to identify the group of M2M devices that share the downlink multicast flow. An M2M device may share more than one downlink multicast service flow each identified by an M2MCID. The M2MCIDs that are assigned to an M2M device may belong to the same M2M group zone. The M2MCID may also be equivalent to the device group identifier (DGID) described earlier.

Figure 8:
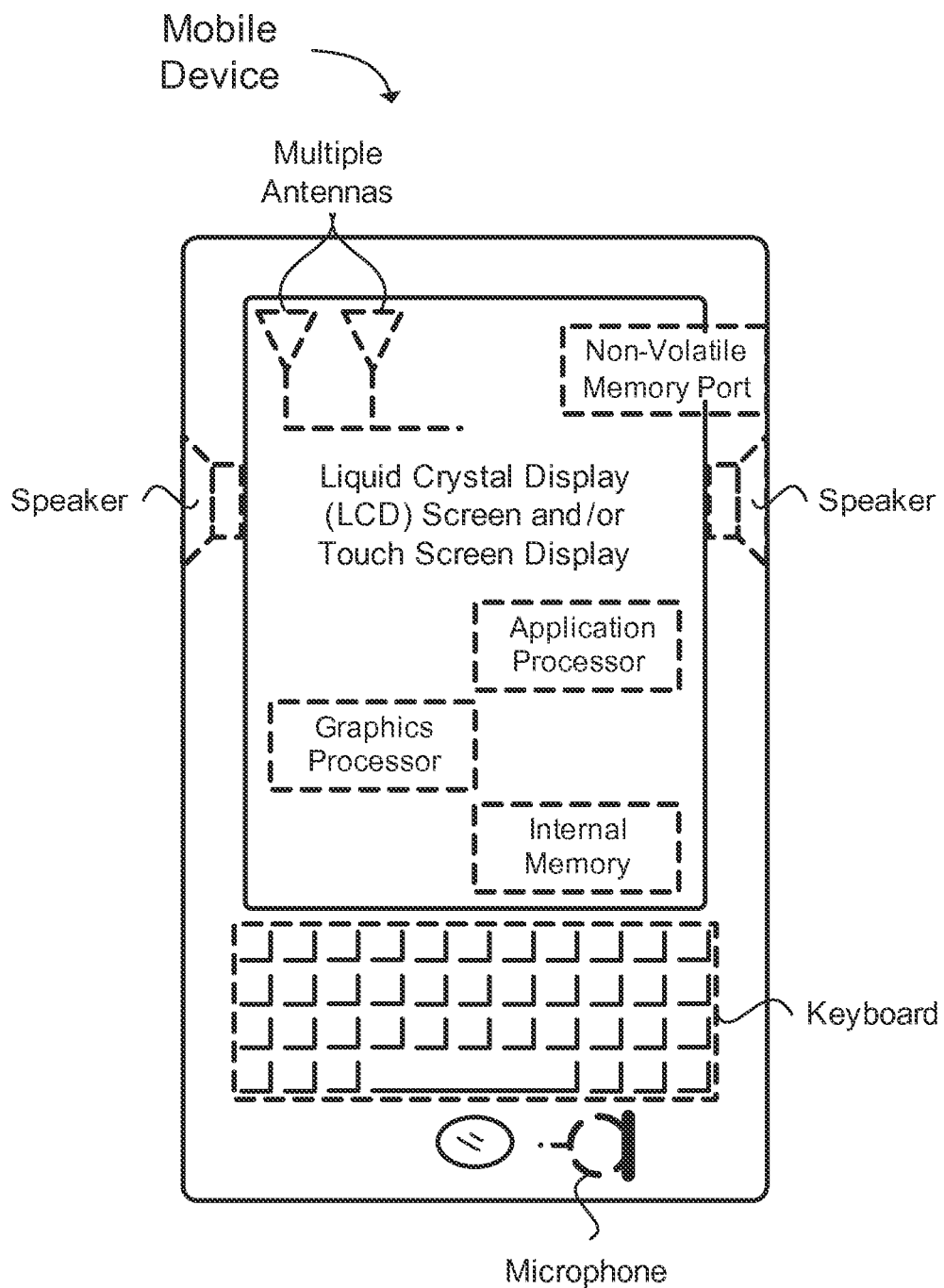
FIG. 8 illustrates an example of a M2M device or mobile device.

FIG. 8 provides an example illustration of a M2M device or mobile device, such as a user equipment (CT), a mobile station (MS), a mobile wireless device, a mobile communication device, a tablet, a handset, or other type of mobile wireless device. A M2M device may include some or all of the features described below for a mobile device, and M2M devices may be small enough to be actually mobile or the described mobile technology components may be embedded in a device that is less mobile (e.g., a heating and air condition system, a refrigerator, etc.) The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. in other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system for individual and group paging of a wireless device via a wireless communications network, comprising:
   the wireless device configured to:
      set a paging cycle for the wireless device to include a paging listening interval (PLI) and a paging unavailable interval (PUI) during a pre-defined period, wherein one PUI and one PLI constitute the paging cycle;
      set a group paging cycle for a device group of a plurality of wireless devices to include a group paging listening interval (GPLI) and a group paging unavailable interval (GPUI) during a group pre-defined period, wherein one GPUI and one GPLI constitute the group paging cycle;
      use the paging cycle to receive paging messages via the wireless communications network;
      receive a group paging indicator for the device group during the PLI of the paging cycle; and
      transition one or more of the plurality of wireless devices in the device group from idle mode to connected mode during the GPLI, based on reception of the group paging indicator in the PLI, to receive group traffic for the device group in a group paging event.

2. The system as in claim 1, wherein the wireless device is assigned to a device group, of a plurality of device groups using a device group identifier.

3. The system as in claim 1, further comprising waking the wireless device to check for paging events during the PLI of the paging cycle.

4. The system as in claim 1, further comprising receiving an individual paging event and the group paging event during the PLI.

5. The system of claim 1, wherein the wireless device is configured to connect to at least one of a wireless local area network (WLAN), a wireless personal area network (WPAN), and a wireless wide area network (WWAN), wherein the wireless device includes an antenna, a touch sensitive display screen, a speaker, a microphone, a graphics processor, an application processor, internal memory, a non-volatile memory port, and combinations thereof.

6. The system of claim 1, wherein the wireless device is further configured to monitor for the group paging indicator during the GPLI.

7. A method for individual and group paging of a wireless device via a wireless communications network, comprising:
   setting a paging cycle and a paging offset for the wireless device such that setting the paging cycle includes a paging listening interval (PLI) and a paging unavailable interval (PUI) during a pre-defined period, wherein one PUI and one PLI constitute the paging cycle;
   setting a group paging cycle for a device group of a plurality of wireless devices to include a group paging listening interval (GPLI) and a group paging unavailable interval (GPUI) during a group pre-defined period, wherein one GPUI and one GPLI constitute the group paging cycle;
   assigning the wireless device to a device group using a device group identifier;
   waking the wireless device to check for paging events received via the wireless communication network during a portion of the paging cycle;
   receiving a group paging indicator for the device group at the wireless device during the PLI of the paging cycle; and
   transitioning one or more of the wireless devices in the device group from idle mode to connected mode during the GPLI, based on reception of the group paging indicator in the PLI, to receive group traffic for the device group in a group paging event.

8. The method as in claim 7, further comprising waking the wireless device to check for paging indicators during the PLI of the paging cycle.

9. The method as in claim 8, further comprising receiving an individual paging event and the group paging event during the PLI.

10. The method as in claim 7, further comprising transitioning from idle mode to connected mode to receive group traffic for the device group after the group paging event has been received.

11. The method as in claim 7, wherein the wireless device is a machine-to-machine (M2M) device or a mobile station (MS).

12. The method as in claim 7, further comprising using a first paging cycle and first paging listening interval to listen for individual paging messages and a second paging cycle and second paging listening interval to listen for group paging messages.

13. The method as in claim 7, further comprising sharing a group paging cycle and a group paging offset between a plurality of device groups when a wireless device belongs to the plurality of device groups.

14. The method as in claim 7, further comprising assigning the wireless device to multiple device groups, wherein the multiple device groups each have a separate paging cycle and separate paging offset.

15. The method as in claim 7, further comprising including information in the group paging indicator about an upcoming group paging event.

16. The method as in claim 15, further comprising including group identification (GID) information in the group paging indicator for the upcoming group paging event.

17. The method as in claim 15, further comprising including group paging offset and group paging cycle information in the group paging indicator for the upcoming group paging event.

18. A non-transitory machine readable storage medium, including program code, when executed to cause a machine to perform the method of claim 7.

19. A method for individual and group paging of a wireless device via a wireless communications network, comprising:
setting an individual paging cycle, individual paging offset, and individual paging listening interval (IPLI) for the wireless device such that setting the individual paging cycle includes the IPLI and an individual paging unavailable interval (IPUI) during a pre-defined period, wherein one IPUI and one IPLI constitute the individual paging cycle;
setting a group paging cycle for a device group of a plurality of wireless devices to include, group paging offset, a group paging unavailable interval (GPUI) and group paging listening interval (GPLI) during a group pre-defined period, wherein one GPUI and one GPLI constitute the group paging cycle;
waking the wireless device to check for a paging event during the IPLI of the paging cycle; and
receiving a group paging indicator during the IPLI at the wireless device;
transitioning one or more of the plurality of wireless devices in the device group from idle mode to connected mode during the GPLI, based on reception of the group paging indicator in the IPLI, to receive group traffic for the device group in a group paging event.

20. The method as in claim 19, further comprising transitioning from idle mode to connected mode to receive group traffic for the device group after the group paging event has been received.

21. The method as in claim 19, further comprising assigning a wireless device to a device group, of a plurality of device groups, using a device group identifier.

22. A method for individual and group paging of a mobile station via a wireless communications network, comprising:
setting a paging cycle and a paging offset for the mobile station such that setting the paging cycle includes a paging listening interval (PLI) and a paging unavailable interval (PUI) during a pre-defined period, wherein one PUI and one PLI constitute the paging cycle;
setting a group paging cycle for a device group of a plurality of wireless devices to include a group paging listening interval (GPLI) and a group paging unavailable interval (GPUI) during a group pre-defined period, wherein one GPUI and one GPLI constitute the group paging cycle
assigning the mobile station to a device group using a Machine-to Machine group identifier (MGID);
waking the mobile station to check for paging events received via the wireless communication network during a portion of the paging cycle;
receiving a group paging indicator for the device group at the mobile station during the PLI of the paging cycle; and
transitioning one or more of the plurality of wireless devices in the device group from idle mode to connected mode during the GPLI, based on reception of the group paging indicator in the PLI, to receive group traffic for the device group in a group paging event.

23. A method as in claim 22, wherein the mobile station is a machine-to-machine (M2M) device.

24. A method as in claim 22, wherein a M2MCID (M2M multicast connection ID) is included in a paging event to identify a downlink multicast service flow.

25. A method as in claim 22, wherein an M2M group zone ID is transmitted for an M2M Group Zone.

26. A method as in claim 22, further comprising an M2M Group Zone Index to be used when the mobile station is part of more than one M2M Group Zone.

\* \* \* \* \*